United States Patent
Phillips

(10) Patent No.: US 7,862,642 B2
(45) Date of Patent: Jan. 4, 2011

(54) EXTENDED-RELEASE UREA-BASED GRANULAR FERTILIZER

(75) Inventor: James C. Phillips, Peachtree City, GA (US)

(73) Assignee: Georgia-Pacific Chemicals LLC, Atlanta, GA (US)

(\*) Notice: Subject to any disclaimer, the term of this patent is extended or adjusted under 35 U.S.C. 154(b) by 586 days.

(21) Appl. No.: 11/610,807

(22) Filed: Dec. 14, 2006

(65) Prior Publication Data

US 2008/0141747 A1    Jun. 19, 2008

(51) Int. Cl.
C05C 9/00    (2006.01)
(52) U.S. Cl. .......................... 71/28; 71/64.03
(58) Field of Classification Search .......... 71/28, 71/64.03
See application file for complete search history.

(56) References Cited

U.S. PATENT DOCUMENTS

| | | | |
|---|---|---|---|
| 2,641,584 A | 6/1953 | Martone | |
| 3,933,956 A | 1/1976 | Mavrovic | |
| 3,936,499 A | 2/1976 | Zardi et al. | |
| 4,008,064 A | 2/1977 | Skauli | |
| 4,019,890 A | 4/1977 | Fujita et al. | |
| 4,023,955 A | 5/1977 | Mueller | |
| 4,025,329 A | 5/1977 | Goertz | |
| 4,089,899 A | 5/1978 | Greidinger et al. | |
| 4,160,782 A | 7/1979 | Van Hijfte et al. | |
| 4,173,582 A | 11/1979 | Greidinger et al. | |
| 4,190,622 A | 2/1980 | Landis | |
| 4,204,053 A | 5/1980 | Elstrom et al. | |
| 4,217,127 A | 8/1980 | Kono et al. | |
| 4,219,589 A | 8/1980 | Niks et al. | |
| 4,298,512 A | 11/1981 | Sartoretto et al. | |
| 4,353,709 A | 10/1982 | Nioh et al. | |
| 4,378,238 A | 3/1983 | Goertz | |
| 4,390,483 A | 6/1983 | Willems et al. | |
| 4,411,683 A | 10/1983 | Goertz | |
| 4,424,176 A | 1/1984 | Shirley, Jr. et al. | |
| 4,501,851 A | 2/1985 | Williams | |
| 4,525,198 A | 6/1985 | Van Hijfte et al. | |
| 4,530,713 A | 7/1985 | Williams | |
| 4,554,005 A | 11/1985 | Hawkins | |
| 4,575,391 A * | 3/1986 | DeBoodt et al. | 71/28 |
| 4,587,358 A | 5/1986 | Blouin | |
| 4,596,593 A | 6/1986 | Tazawa et al. | |
| 4,599,102 A | 7/1986 | Hawkins | |
| 4,610,715 A | 9/1986 | Monaldi et al. | |
| 4,776,879 A | 10/1988 | Hawkins et al. | |
| 4,778,510 A | 10/1988 | Hawkins | |
| 4,842,790 A | 6/1989 | Nunnelly | |
| 4,881,963 A | 11/1989 | Fujita et al. | |
| 4,885,021 A | 12/1989 | Elrod | |
| 4,895,983 A | 1/1990 | Nakayama et al. | |
| 5,039,328 A | 8/1991 | Saitoh | |
| 5,043,417 A | 8/1991 | Worsley et al. | |
| 5,079,067 A * | 1/1992 | Willging | 428/182 |
| 5,102,440 A | 4/1992 | Gallant et al. | |
| 5,266,097 A | 11/1993 | Moore | |
| 5,362,842 A | 11/1994 | Graves et al. | |
| 5,599,374 A | 2/1997 | Detrick | |
| 5,653,781 A | 8/1997 | Kayaert et al. | |
| 5,674,971 A | 10/1997 | Graves | |
| 5,698,002 A | 12/1997 | Hudson | |
| 5,965,071 A | 10/1999 | Fujii et al. | |
| 6,039,781 A | 3/2000 | Goertz et al. | |
| 6,048,378 A | 4/2000 | Moore | |
| 6,114,491 A | 9/2000 | Dupre et al. | |
| 6,231,633 B1 | 5/2001 | Hirano et al. | |
| 6,254,655 B1 | 7/2001 | Goertz | |
| 6,284,921 B1 | 9/2001 | Luhtala | |
| 6,306,194 B1 | 10/2001 | Wertz et al. | |
| 6,399,719 B1 | 6/2002 | Dopico et al. | |
| 6,579,338 B2 | 6/2003 | Wertz et al. | |
| 6,586,557 B2 * | 7/2003 | Taylor | 528/230 |
| 6,632,262 B2 | 10/2003 | Gabrielson | |
| 6,663,686 B1 | 12/2003 | Geiger et al. | |
| 6,827,887 B2 | 12/2004 | Zardi et al. | |
| 6,936,573 B2 | 8/2005 | Wertz et al. | |
| 6,936,681 B1 | 8/2005 | Wertz et al. | |
| 7,018,440 B2 | 3/2006 | Tabei | |
| 7,018,441 B2 | 3/2006 | Tabei | |
| 2003/0154754 A1 | 8/2003 | Costa et al. | |
| 2004/0023809 A1 | 2/2004 | Wertz et al. | |
| 2005/0144997 A1 | 7/2005 | Phillips et al. | |
| 2006/0196241 A1 | 9/2006 | Phillips et al. | |

FOREIGN PATENT DOCUMENTS

| | | |
|---|---|---|
| WO | WO 94/03267 | 2/1994 |
| WO | 99/32534 A1 | 7/1999 |
| WO | WO 00/55104 | 9/2000 |
| WO | WO 00/78835 | 12/2000 |
| WO | 02/16458 A2 | 2/2002 |
| WO | 2005/063654 A2 | 7/2005 |

OTHER PUBLICATIONS

Clapp, John G., "Urea-Triazone N Characteristics and Uses", Director, Technical Agricultural Products, Research and Development Team, Tessenderlo Kerley, Inc.
Univ Nanjing, Coating Slow Release Urea Comprise Core Layer Film, Database WPI Week 200611, Derwent Publications Ltd., London, GB (Abstract Only).
PCT Search Report, Jun. 5, 2008.

\* cited by examiner

Primary Examiner—Timothy C Vanoy
Assistant Examiner—Michelle Hou
(74) Attorney, Agent, or Firm—Michael S. Kerns

(57) ABSTRACT

An improved granular-type urea fertilizer having an extended or slow release nitrogen component in which a non-thermosetting urea-formaldehyde resin concentrate is used to provide the granular fertilizer with an extended-release nitrogen component.

6 Claims, No Drawings

EXTENDED-RELEASE UREA-BASED GRANULAR FERTILIZER

FIELD OF THE INVENTION

The present invention relates to an improved granular-type urea fertilizer having an extended or slow release nitrogen component. The invention specifically relates to a granular-type urea fertilizer in which a non-thermosetting urea-formaldehyde resin solution is used to provide the granular fertilizer with an extended-release nitrogen component.

BACKGROUND OF THE INVENTION

Urea is made primarily by reacting carbon dioxide with anhydrous ammonia at high pressure and temperature and with removal of by-product water (dehydration). The resulting molten material can be processed into prills or granules for use as a fertilizer. Normally, the granular form is somewhat larger in particle size than the prills.

Urea, whether granulated or prilled, (which together hereinafter will be referred to in combination as a granular-type urea) is one of the most widely used fertilizers. Urea is a white crystalline solid under normal ambient conditions containing 46% nitrogen. Urea is highly water soluble.

Urea has a number of recognized advantages relative to other nitrogen fertilizers. Urea is safer to ship and handle than for example ammonium nitrate. Urea is less corrosive to equipment than for example ammonium sulfate. Because urea has a higher nitrogen content than these other nitrogen-based fertilizers, urea also supplies more nitrogen per ton of applied solids.

While the prior art has proposed a variety of ways for producing granular-type urea fertilizers, the prior art has not successfully provided a primarily urea-based fertilizer with an extended-release nitrogen component. Thus, there remains a continuing need for a new granular-type urea fertilizer having extended-release nitrogen.

DETAILED DESCRIPTION OF THE INVENTION

The present invention relates to an improvement in the production of granular-type urea-based fertilizers. The present invention is directed more specifically to a granular-type urea fertilizer that contains an extended or slow release nitrogen component. The invention also is directed to the related method of using the granular-type urea fertilizer to fertilize plants, including grasses.

According to the present invention, an alkaline, water-soluble, non-thermosetting urea-formaldehyde (U-F) resin is used as a key raw material in what can otherwise be a conventional urea prilling or granulation procedure. By introducing the alkaline, water-soluble non-thermosetting U-F resin into the prilling or granulation process, a granular-type urea fertilizer is prepared having an extended-release nitrogen component.

In one particular embodiment, a concentrated, water-soluble U-F resin, as defined in more detail below, is added to a granulation apparatus with a fluid source of urea. The urea can be supplied either in a molten form or as a concentrated aqueous solution (70% solids and greater) and preferably as a highly concentrated aqueous solution (typically greater than 95% solids). The urea and UF resin can be mixed before they are introduced into the granulation equipment, or they can mixed by commingling separate streams of urea and U-F resin within the equipment. The invention is not limited to any particular granulation apparatus and conventional urea granulation equipment can be used to prepare the inventive product. Skilled workers will appreciate how to use such equipment for preparing the granular product of the present invention and the use of any particular granulating equipment is not an aspect of the present invention.

In another embodiment, the concentrated, water-soluble U-F resin, as defined in more detail below, is mixed with a fluid source of urea and the mixture is processed in a prilling apparatus. Again, the urea can be supplied either in a molten form or as a concentrated aqueous solution (70% solids and greater) and preferably as a highly concentrated aqueous solution (typically greater than 95% solids). Again, the urea and UF resin can be mixed before they are introduced into the prilling apparatus, or they can mixed by commingling separate streams of urea and U-F resin within the apparatus. The invention is not limited to any particular prilling apparatus and conventional urea prilling equipment can be used to prepare the inventive product. Skilled workers will appreciate how to use such equipment for preparing the granular/prilled product of the present invention and the use of any particular prilling apparatus is not an aspect of the present invention.

The U-F resin used for making the granular-type urea fertilizer of the present invention is an alkaline, water-soluble, non-thermosetting U-F resin. Water-soluble U-F resins suitable for use in making the granular-type urea fertilizer of the present invention are known in the prior art and can be prepared by reacting formaldehyde, urea and optionally (although preferably), ammonia or a primary amine. These ingredients are reacted under alkaline conditions and in the substantial absence of any acid condensation. The mole ratios of the various reactants are set so that a non-thermosetting U-F resin is produced. Such materials are liquid, or can be made fluid by the addition of heat. In the absence of any added acid, such materials are non-thermosetting.

In accordance with the present invention, the concentrated urea-formaldehyde resin solution is prepared by reacting urea and formaldehyde and optionally ammonia or a primary amine under alkaline reaction conditions. The use of a formaldehyde (F) to urea (U) to ammonia (or primary amine) (A) mole ratio (F:U:A) broadly in the range of 0.5-4.0:1.0:00-1.0 for making the concentrated urea-formaldehyde resin solution, and more usually in the range of 0.5-2.5:1.0:0.0-0.5 is typical. There are a variety of processes known in the prior art for making such resins and in the broadest aspects of the present invention such processes and the resulting non-thermosetting, aqueous urea-formaldehyde solutions are intended to be embraced by the present invention. It is important that the reaction between the urea, formaldehyde and the optional ammonia (or primary amine) be conducted under alkaline reaction conditions and at an appropriate mole ratio (excess urea and optional ammonia or amine) so that so that a large thermosetting-promoting amount of the self-condensing methylolated urea species are not formed. Reaction temperatures between 50 and 100° C. are common, with a reaction time period as short as 30 minutes or as long as 5 hours being possible.

Reacting urea, formaldehyde and optional ammonia (or amine) as described above, produces a liquid resin product that is not thermosetting, containing unreacted urea, and a variety of urea-formaldehyde adducts including a variety of cyclic urea adducts (referred to as a group hereinafter as trazones), mono-substituted ureas including monomethylol urea, and di/tri-substituted ureas, including di/trimethylene ureas. These urea-formaldehyde adducts are referred to hereinafter as the urea-formaldehyde resin solids.

Formaldehyde for making a U-F resin solution in accordance with the present invention is available in many forms.

Paraform (solid, polymerized formaldehyde) and formalin solutions (aqueous solutions of formaldehyde, sometimes with methanol, in 317%, 44%, or 50% formaldehyde concentrations) are commonly used forms. Formaldehyde also is available as a gas. Any of these forms is suitable for use in the practice of the invention. Typically, formalin solutions are preferred as the formaldehyde source.

Similarly, urea for making a U-F resin solution in accordance with the present invention is available in many forms. Solid urea, such as prill, and urea solutions, typically aqueous solutions, are commonly available. Further, urea may be combined with another moiety, most typically formaldehyde and urea-formaldehyde, often in aqueous solution. Any form of urea or urea in combination with formaldehyde is suitable for use in the practice of the invention. Both urea prill and combined urea-formaldehyde products are preferred, such as Urea Formaldehyde Concentrate or UFC 85. These types of products are disclosed in, for example, U.S. Pat. Nos. 5,362,842 and 5,389,716.

Ammonia for making a U-F resin solution in accordance with the present invention is available in various gaseous and liquid forms, particularly including aqueous solutions at various concentrations. Any of these forms is suitable for use. However, commercially-available aqueous ammonia-containing solutions are preferred herein. Such solutions typically contain between about 10 and 35% ammonia. An aqueous solution containing about 28% ammonia is normally used. Anhydrous ammonia may also be used.

As noted above, as an alternative (or supplement) to ammonia, a primary amine may also be used. The use of a primary amine for making U-F triazone materials, is described for example in U.S. Pat. Nos. 2,641,584 and 4,778,510, each of which is incorporated herein by reference in its entirety. These patents describe suitable primary amines for making U-F triazone materials as including, but not limited to, alkyl amines such as methyl mine, ethyl amine, and propyl amine, lower hydroxyamines such as ethanolamine cycloalkyl-monoamines such as cyclopentylamine, ethylenediamine, hexamethylenediamine, and linear polyamines. The primary amine may be substituted or unsubstituted. For reasons of availability and cost, ammonia will generally be used.

One suitable alkaline, water soluble, non-thermosetting U-F resin is described and claimed in U.S. Pat. No. 6,632,262, the entire contents of which are incorporated herein by reference. U.S. Pat. No. 6,632,262 describes reacting formaldehyde, urea, and ammonia under aqueous, alkaline conditions, so as to avoid acid condensation conditions, at a formaldehyde/urea/ammonia ratio of about 0.6-1/1/0.25-0.35. The solution of reactants is heated to about 80° C. to about 95° C., preferably to about 85° C. to about 90° C., and held for at least about 45 minutes, preferably about 45 minutes to about 120 minutes, more preferably about 60 to about 75 minutes, to ensure some triazone formation and to complete reaction of formaldehyde. Following the reaction, approximately 14 to 20% of the urea in the original mixture is in the form of triazone. The pH of the solution is at least 7, preferably about 7.5 to about 10.5, and more preferably about 8.5 to about 9.5. Following the reaction, the solution then is cooled to less than about 50° C., preferably to about ambient temperature and the pH is adjusted, as needed, to be within the range of about 9 to about 10.5, preferably from about 9.5 to about 10.

A typical aqueous urea-formaldehyde resin solution made in accordance with U.S. Pat. No. 6,632,262 has a free urea content of 45-55 wt %, a cyclic urea (traone) content of 14-20 wt %, a monomethylol urea content of 25-35 wt % and a di/trimethylurea content of 5-15 wt % based on the weight of the urea-formaldehyde resin solution wherein the rest of the solution is composed predominately of water.

Due to its alkaline preparation, the mole ratio of the reactants and the residual level of alkalinity, the U-F resin prepared in accordance with U.S. Pat. No. 6,632,262 is non-thermosetting and can be distilled to a high solids concentration without causing undesired resin advancement and significant formation of water-insoluble reaction products. For example, a product made at an initial nitrogen content of 30% (at a solids concentration of about 70%, measured as the residual solids following heating at 105° C.) can be distilled to a liquid containing 35% nitrogen. Higher solids contents can be obtained by distilling the aqueous resin solution, usually under a vacuum. Indeed, this same liquid can be distilled further to produce a material containing 38% nitrogen that, although forming a gel at ambient conditions, can be melted and will remain molten (fluid) at temperatures above 60° C. (as recognized by those skilled in the art, process temperatures should not be so high as to cause decomposition of the material).

Suitable urea-formaldehyde resins of a higher triazone (cyclic urea) content can be prepared by reacting formaldehyde, urea and ammonia (or an amine) at a mole ratio (F:U:A) in the range of 1.0-4.0:1.0:0.5-1.0. These urea-formaldehyde resins of higher cyclic urea content generally contain at least 20% of triazone and substituted triazone compounds. In such resins, the ratio of cyclic ureas to di- and tri-substituted ureas and mono-substituted ureas varies with the mole ratio of the reactants. For example, a resin prepared at a mole ratio of 2.0:1.0:0.5 (F:U:A) would be expected to produce a solution containing approximately 42% cyclic ureas, approximately 28% di/tri-substituted ureas, approximately 24% mono-substituted ureas, and approximately 5% free urea. Alternatively, a urea-formaldehyde resin prepared at a mole ratio of 1.2:1.0:0.5 (F:U:A) would be expected to produce a solution containing approximately 26% cyclic ureas, approximately 7% di/tri-substituted ureas, approximately 32% mono-substituted ureas, and approximately 35% free urea.

Methods for making such higher triazone-containing urea-formaldehyde resins also are known to those skilled in the art. Especially preferred are those urea-formaldehyde resins having a high content of cyclic urea and a low content of free urea. Urea-formaldehyde resins of a high cyclic urea content suitable for use in this preferred aspect of the invention are described, for example, in U.S. Pat. No. 6,114,491, which is hereby incorporated by reference in its entirety. As described in Example 1 of this patent, urea-formaldehyde resins with cyclic urea contents in excess of 75% can be prepared. One suitable urea-formaldehyde resin with a desired cyclic urea content is made at a reactant mole ratio of formaldehyde to urea to ammonia of 0.81:1:0.25.

Another water-soluble U-F resin that can be used to make the granular-type urea fertilizer of the present invention is the triazone material described in U.S. Pat. No. 4,554,005, the entire contents of which also are incorporated herein by reference. U.S. Pat. No. 4,554,005 describes making a triazone material in a two-stage method, under alkaline reaction conditions, in which urea is reacted with formaldehyde and ammonia with the urea to formaldehyde (U:F) mole ratio ranging from about 1.2:1 to 1.6:1, and with ammonia (or an amine) on a weight percentage being preferably about 3.0% to about 3.5%, such that total nitrogen in solution ranges between about 16 and 31% by weight. Again, the reaction product is an alkaline, non-thermosetting, water-soluble U-F resin.

Still other alkaline, non-thermosetting water-soluble U-F resins that can be used to make the granular-type urea fertilizer of the present invention include water soluble, non-thermosetting, triazone materials described in WO 00/078835, U.S. Pat. No. 4,599,102 and U.S. Pat. No. 4,778,510, and water-soluble, non-thermosetting U-F materials described in U.S. Pat. No. 3,970,625, U.S. Pat. No. 4,244,727, U.S. Pat. No. 4,304,588 and U.S. Pat. No. 5,449,394, the entire contents of which also are incorporated herein by reference.

In the broad practice of the present invention, any source of urea can be used for combining with the concentrated aqueous urea-formaldehyde resin solution. To avoid the energy demand associated with re-processing a solution, slurry or melt of urea, it is preferable to prepare the granular-type urea fertilizer of the present invention as part of the original urea prilling or granulation operation. Those skilled in the art appreciate that there are a wide variety of techniques and apparatus for producing the granular-type product of the present invention. As a representative, though clearly not an exhaustive list of possible processes and devices that can be adapted by a skilled worker to produce the granular-type urea product of the present invention, the reader is referred to the following publications, U.S. Pat. Nos. 3,334,160; 3,450,804; 3,533,776; 3,877,415; 3,933,956; 33936,499; 4,190,622; 4,217,127; 4,219,589; 4,353,709; 4,390,483; 4,424,176; Material discharged from the granulating device then is size segregated. Oversized particles may be crushed and recycled with undersize particles recycled back to the granulating (or prilling) device for possible use as seed material. The urea and the U-F resin are combined in an amount by weight of urea solids:U-F resin solids broadly between 50:50 and 95:5, more usually between 60:40 and 95:5 and most often between 70:30 and 90:10.

A minor amount of other primary fertilizing materials that also can be added during the granulating or prilling operation include, for example, ammonium sulfate, ammonium nitrate, and ammonium phosphates. Common secondary nutrients include potassium and phosphorus salts and calcium salts. Micro-nutrient salts which would supply trace elements, include salts of iron, zinc, magnesium, manganese and boron. Amounts of such materials that do not interfere with the granulation or prilling operation can be added.

While the granular-type urea product prepared in accordance with the present invention will generally be used alone in the fertilization of many plants, it also is contemplated that the granular-type urea product prepared in accordance with the present invention could be used as a component of a blended fertilizer.

The present invention also contemplates the use of other techniques for further altering the release characteristics of the granular-type urea product prepared in accordance with the present invention. In particular, applying a coating of a release-altering material, such as sulfur, wax, alkyd resins, epoxy resins, polyurethane resins and other similar materials, is contemplated. Also contemplated is the addition of other materials conventionally added as part of the granular-type urea fertilizers including nitrification inhibitors and the like.

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention, which is limited only by the appended claims.

Example 1

Repeated from Example 2 of U.S. Pat. No. 6,632,262

The following ingredients were combined by adding in the following order: UFC; first addition of ammonium hydroxide; first addition of urea; second addition of ammonium hydroxide; and second addition of urea. The combination of ingredients is heated to 85° C. to 90° C. and held for 60 minutes. The pH is monitored every 15 minutes and adjusted as necessary to maintain a pH between 8.6 and 10 using 25% caustic.

| Ingredient | Concentration | Weight % |
|---|---|---|
| UFC, 85% | 85 | 37.9 |
| Ammonium hydroxide | 28 | 0.5 |
| Urea, prill | 100 | 28.4 |
| Ammonium hydroxide | 8 | 15.4 |
| Urea, prill | 100 | 18.3 |
| Caustic | 25 | to adjust pH |
| Formic Acid | 23 | to adjust pH |
| Water | | to adjust % N |

The combination is then cooled to 25° C. and analyzed for % nitrogen and % free urea (by $^{13}$C-NMR).

Approximate results: % Nitrogen 30; pH 10.1; % Free urea=50% which corresponds to <50% quick release; % triazone (cyclic urea)=20; % di and tri-substituted ureas=4; % mono-substituted ureas=29.

The nitrogen concentration (and the solids concentration) can be increased by vacuum distillation of the resulting urea-formaldehyde resin liquid product.

Example 2

Repeated from Example 1 of U.S. Pat. No. 6,114,491

Preparation of Urea-Formaldehyde Resins of High Cyclic Urea Content a) A urea-formaldehyde resin containing cyclic urea is prepared at a mole ratio of 2.0:1.0:0.5 formaldehyde:urea:ammonia (F:U:A), by charging a reaction vessel with formaldehyde, ammonia, and urea while maintaining the temperature below about 65° C. Once all the reactants are in the reaction vessel, the resulting solution is heated to about 90° C., for about 1 hour until the reaction is complete. Once the reaction is complete, the solution is cooled to room temperature. Approximately 42.1% of the urea is contained in the triazone ring structure, 28.5% of the urea is di/tri-substituted, 24.5% of the urea is mono-substituted, and 4.9% of the urea is free unreacted urea.

b) A second urea-formaldehyde resin containing cyclic urea is prepared in the same manner as a) except that the mole ratio of 1.2.1.0:0.5 (F:U:A) is used. Approximately 25.7% of the urea in the resulting product is contained in the triazone ring structure, 7.2% of the urea is di/tri-substituted, 31.9% of the urea is mono-substituted, and 35.2% of the urea is free.

c) A third urea-formaldehyde resin containing cyclic urea is prepared in the same manner as a) except that the mole ratio (F:U:A) of 3:1:1 is used and the combination of ingredients is heated to about 90° C. for 1 hour and then 100° C. for 2 hours. Approximately 76.0% of the urea in the resulting U-F resin is contained in the triazone ring structure, 15.3% of the urea is di/tri-substituted, 8.1% of the urea is mono-substituted, and 0.6% of the urea is free.

d) A fourth urea-formaldehyde resin containing cyclic urea is prepared in the same manner as a) except that the mole ratio (F:U:A) of 4:1:1 is used and the combination of ingredients is heated to about 90° C. for 3 hours and the pH is controlled around 7.5. Approximately 79.2% of the urea is contained in the triazone ring structure, 17.7% of the urea is di/tri-substituted, 1.6% of the urea is mono-substituted, and 11.5% of the urea is free.

Example 3

Aqueous urea-formaldehyde resin solutions prepared substantially in accordance with the procedure of Example 1 can be processed (using vacuum distillation) to a solids content of about 80% by weight and 92% by weight respectively.

Example 4

An aqueous urea-formaldehyde resin solution prepared substantially in accordance with the procedure of Example 2a) was processed (using vacuum distillation) to solids contents of about 70%, 80% and 92% by weight. These concentrated aqueous urea-formaldehyde resin solutions are identified hereafter as UFP-1, UFP-2 and UFP-3, respectively.

Example 5

A granular-type urea fertilizer product is made by melting 783 parts by weight of urea prills; then adding 212.8 parts by weight of the concentrated liquid UFP-3 material of Example 4 and 4.2 parts by weight of citric acid to the urea melt and then pan granulating the liquid mixture.

Example 6

A granular-type urea fertilizer product is made by melting 850 parts by weight of urea prills; then adding 187.5 parts by weight of the concentrated liquid UFP-2 material of Example 4 to the urea melt; pan granulating the liquid mixture and then screening to a size of −5/+10 on the Tyler Screen Series.

Example 7

A granular-type urea fertilizer product is made by melting 850 parts by weight of urea prills; then adding 214.3 parts by weight of the concentrated liquid UFP-1 material of Example 4 to the urea melt; pan granulating the liquid mixture and then screening to a size of −5/+10 on the Tyler Screen Series.

Example 8

A granular-type urea fertilizer product is made by melting 850 parts by weight of urea prills; then adding 265.6 parts by weight of the concentrated liquid UFP-2 material of Example 4 to the urea melt; pan granulating the liquid mixture and then screening to a size of −5/+10 on the Tyler Screen Series.

Example 9

The potential phytotoxicity of the granular-type fertilizer of the present invention (Nitamin® 43G) (having a particle size of 260-SGN (Size Guide Number)) was compared with a granular urea (having a particle size in the 220-260 SGN range). SGN is defined as the median particle size (in millimeters), i.e., 50% of the particles (by weight) have a particle size above and below this number. The respective fertilizers were applied to a Kentucky bluegrass (*Poa pratenis* L.) turf stand at the Hancock Turfgrass Research Center on the campus of Michigan State University. The granular fertilizer of the present invention was prepared by co-granulating urea and a U-F triazone material similar to Example 2B commercially available from Georgia-Pacific under the designation GP-4350 or Nitamin® 30L (having 23% cyclic ureas 5% di/tri substituted ureas, 29% mono substituted ureas and 43% free urea) made using a process similar to Example 5. Such granular-type fertilizers benefit from post-treatment with an acid, such as phosphoric acid, to reduce ammonia emission.

The experimental design was a randomized complete block design with 3 replications. Fertilizer treatments were applied at rates of 1, 2, and 6 lbs. Nitrogen/1000 ft$^2$. Treatments were applied with a hand shaker container over a 12 ft$^2$ area. Irrigation (0.25" water) was not applied until 3 days after treatment application. Visual ratings were conducted on a scale 1-9 with 1=no burn or discoloration, 6=moderate burn or discoloration, and 9=severe burn or discoloration.

The average results of the treatment, reported at various days after the application (DAT) are presented in the Table below.

TABLE

| Fertilizer Source | Rate of Application (lb N/1000 ft$^2$) | Mean Phytotoxicity Score DAT 3 | DAT 5 | DAT 13 | DAT 20 |
|---|---|---|---|---|---|
| UREA | 1 | 1 | 1 | 1 | 1 |
|  | 2 | 2.3 | 3.7 | 2.3 | 1 |
|  | 6 | 7.7 | 8.2 | 7.7 | 4.0 |
| Nitamin® 43G | 1 | 1 | 1.3 | 1 | 1 |
|  | 2 | 1 | 1.3 | 1 | 1 |
|  | 6 | 6.7 | 7.7 | 7 | 4.3 |

As used throughout the specification and claims the term "concentrated" means a solids content of at least about 70% by weight.

The present invention has been described with reference to specific embodiments. However, this application is intended to cover those changes and substitutions that may be made by those skilled in the art without departing from the spirit and the scope of the invention Unless otherwise specifically indicated, all percentages are by weight. Throughout the specification and in the claims the term "about" is intended to encompass + or −5%.

I claim:

1. A granular-type urea fertilizer comprising a mixture of from 50% to 95% by weight urea and 50% to 5% by weight of non-thermosetting urea-formaldehyde resin solids based on the combined weight of the urea and the non-thermosetting urea-formaldehyde resin solids.

2. The granular-type urea fertilizer of claim 1 wherein the urea-formaldehyde resin solids are made by reacting formaldehyde (F), urea (U) and optionally ammonia (A) and optionally a primary amine (A) in the absence of acid condensation at a mole ratio of urea to formaldehyde to ammonia and primary amine (F:U:A) in the range of 0.5-4.0:1.0:0.0-1.0.

3. The granular-type urea fertilizer of claim 2 wherein the urea-formaldehyde resin solids is made by reacting formaldehyde, urea and optionally ammonia and optionally a primary amine in the absence of acid condensation.

4. The granular-type urea fertilizer of claim 2 wherein the urea-formaldehyde resin solids contains more than 20% by weight triazone.

5. A process for making a granular-type urea fertilizer comprising mixing urea with an non-thermosetting urea-formaldehyde resin concentrate to provide a fluid mixture containing from 50% to 95% by weight urea and from 50% to 5% by weight of urea-formaldehyde resin solids based on the combined weight of the urea and the non-thermosetting urea-formaldehyde resin solids, the urea being in a form selected from a urea melt and a concentrated urea solution; and then solidifying the fluid mixture to produce the granular-type fertilizer comprising a mixture of urea and non-thermosetting urea-formaldehyde resin solids.

6. The process of claim 5 wherein the non-thermosetting urea-formaldehyde resin concentrate is made by reacting formaldehyde (F), urea (U) and optionally ammonia (A) and optionally a primary amine (A) in the absence of acid condensation at a mole ratio of urea to formaldehyde to ammonia and primary amine (F:U:A) in the range of 0.5-4.0:1.0:0.0-1.0.

* * * * *